United States Patent [19]

Sawa

[11] Patent Number: 5,508,121
[45] Date of Patent: Apr. 16, 1996

[54] NICKEL HYDROXIDE ELECTRODE FOR USE IN AN ALKALINE SECONDARY BATTERY

[75] Inventor: Haruo Sawa, Iwaki, Japan

[73] Assignee: Furukawa Denchi Kabushiki Kaisha, Kanagawa, Japan

[21] Appl. No.: 202,072

[22] Filed: Feb. 25, 1994

[51] Int. Cl.$^6$ .................................................. H01M 10/34
[52] U.S. Cl. .......................... 429/59; 429/101; 429/209; 429/223; 429/233; 429/236
[58] Field of Search ........................... 429/209, 220, 429/221, 223, 224, 233, 236, 59, 101

[56] References Cited

U.S. PATENT DOCUMENTS

| | | | |
|---|---|---|---|
| 4,460,666 | 7/1984 | Dinkler et al. | 429/236 |
| 5,069,988 | 12/1991 | Tomantschger et al. | 429/221 |
| 5,344,728 | 9/1994 | Ovshinsky et al. | 429/101 |
| 5,366,828 | 11/1994 | Struthers | 429/209 |

*Primary Examiner*—Bruce F. Bell
*Attorney, Agent, or Firm*—Breiner & Breiner

[57] ABSTRACT

A nickel hydroxide electrode useful in an alkaline secondary battery containing at least one of a copper-based additive or a manganese-based additive in either a nickel hydrogen active material as applied to a porous metal substrate, in a porous metal substrate itself, or both. The copper-based additive is at least member of the group consisting of copper, cuprous oxide and cupric oxide. The manganese-based additive is at least member of the group consisting of metal manganese, $MnO$, $Mn_2O_3$, $Mn_3O_4$, $MnO_2$, $MnO_3$, $Mn_2O_7$, $Mn(OH)_2$, $MnCO_3$, $K_2MnO_2$, and $KMnO_4$. When the additive is used in a positive electrode for an alkaline secondary battery, the rate of absorption of hydrogen gas generated in the battery is accelerated resulting in a reduction of the internal pressure of the battery. Further, the excess capacity of the negative electrode in relation to the capacity of the positive electrode can be reduced resulting in an increase in the battery capacity per unit volume.

9 Claims, 3 Drawing Sheets

NICKEL HYDROXIDE ELECTRODE FOR USE IN AN ALKALINE SECONDARY BATTERY

FIELD OF THE INVENTION

The invention relates to nickel hydroxide electrodes suitable for use in alkaline secondary batteries.

BACKGROUND OF THE INVENTION

Paste and sintered nickel hydroxide electrodes are known for use as positive electrodes for alkaline secondary batteries, such as a nickel-cadmium battery, a nickel-hydrogen battery and the like. In both paste and sintered electrodes, the positive active material utilized is nickel hydroxide, which serves as the main active component, and nickel or cobalt, which serve as an auxiliary electro-conductive component. The positive active material is contained on or in a substrate, for example, a foam nickel substrate for a paste electrode and a sintered nickel substrate for a sintered electrode.

Conventional alkaline secondary batteries as described above, however, have various defects. Conventional nickel hydroxide electrodes have a very slow absorption rate for hydrogen gas generated from the negative electrode at the time of charging due to the oxidation of the hydrogen gas to water. Therefore, in a sealed nickel-cadmium battery or a sealed nickel-hydrogen battery, the negative electrode is generally required to be provided with a larger capacity than the positive electrode in order to provide for the generation of oxygen gas prior to the generation of hydrogen gas and thereby the absorption of the hydrogen gas at the negative electrode by reduction. This results in an increase in the volume of the battery. However, there are limits to providing an excessive capacity to the negative electrode as compared to the capacity of the positive electrode since the volume of the battery to be produced is limited. Contrarily, if the capacity of the negative electrode is decreased, the volume or capacity of the battery is also decreased which is not desirable. Further, in a nickel-hydrogen battery, the hydrogen gas is emitted directly from the hydride of the negative electrode which increases the internal pressure in the battery. The released hydrogen gas is also flammable and susceptible to leaking.

OBJECTS AND BRIEF DESCRIPTION OF THE INVENTION

The present invention solves the above-described problems by providing a nickel hydroxide electrode, which when used as a positive electrode in an alkaline secondary battery, has an increased absorption rate for hydrogen gas generated by the negative electrode. Accordingly, as compared to conventional batteries, the excess capacity of the negative electrode, in relation to the capacity of the positive electrode, can be reduced. Further, the internal pressure o the sealed battery is reduced. The nickel hydroxide electrode of the present invention is characterized by the inclusion of at least one of a copper-based additive or a manganese-based additive, either in the positive active material of the electrode, in a porous metal substrate of the electrode which is utilized with a positive active material, or in both.

The copper-based additive is at least one component selected from the group consisting of copper, cuprous oxide and cupric oxide. The manganese-based additive is at least one component selected from the group consisting of metal manganese, $MnO$, $Mn_2O_3$, $Mn_3O_4$, $MnO_2$, $MnO_3$, $Mn_2O_7$, $Mn(OH)_2$, $MnCO_3$, $K_2MnO_2$, and $KMnO_4$.

The positive active material for use in the positive electrode is a mixture comprising a major amount of a nickel hydroxide active powder material and a minor amount of a binder material such as a synthetic resin powder or the like. The mixture can also include a thickener, such as an aqueous solution of carboxymethylcellulose (CMC) or the like, to form a paste.

The porous metal substrate to be used in the positive electrode is conventional in nature and is generally in the form of a plate or sheet made of nickel or nickel-plated steel. The substrate can be a punched or perforated sheet, an expanded plate, or the like.

The copper-based additive and the manganese-based additive, when included in a nickel hydroxide electrode of an alkaline secondary battery, are oxidized at the time of charging to a higher oxide which has the ability to quickly absorb hydrogen gas when it contacts the hydrogen gas. Even after the oxide has been reduced as a result of the absorption of hydrogen gas, the reduced additive can be oxidized again by the continued charging operation. Thus, the additive can be utilized repeatedly. Accordingly, a nickel hydroxide electrode containing at least one of the copper-based or manganese-based additives exhibits quick hydrogen gas absorptivity continuously. Presently, the specific reason why the higher or highest oxides have the ability to absorb hydrogen gas as above described is not finally understood. However, it has been determined that when a nickel hydroxide positive electrode contains the copper-based and/or manganese-based additive(s), the absorption rate of hydrogen gas by the positive electrode is unexpectedly and remarkably accelerated. As a result, a sealed alkaline secondary battery is obtained which has a decreased rise in internal pressure as caused by the generation of hydrogen gas, as compared to conventional nickel hydroxide electrodes.

The additive(s) of the invention are contained in the positive active material of the electrode in an amount of preferably about 0.5–10 wt. % based on the total weight of the positive active material. If the additive amount is less than 0.5 wt. %, little effect is observed. If the additive amount is greater than 11 wt. %, the amount of the nickel hydroxide active material is not great enough to provide a battery with a high capacity.

In manufacturing conventional porous metal substrates for an electrode, such as a foam nickel substrate plate, a sintered nickel substrate plate or the like, a minor amount of the copper-based additive(s) and/or manganese-based additive(s) can be mixed uniformly as a raw material in the manufacture of the substrates. Thus, any type of porous metal substrate plate or sheet containing the additive can be manufactured. The amount of the additive(s) contained in the porous metal substrate is generally from about 2–10 wt. % based on the total weight of the substrate raw materials. If the amount of the additive(s) in the substrate is too large, the electroconductivity of the substrate is reduced.

Providing a porous metal substrate containing the copper-based additive(s) and/or manganese-based additive(s) uniformly distributed over the exterior surfaces of the porous metal substrate is advantageous since the additive(s) are then brought into contact with the nickel hydroxide active material particles when they are coated onto and fill in the pores of the porous metal substrate.

DETAILED DESCRIPTION AND PRESENTLY PREFERRED EMBODIMENTS

Presently preferred embodiments of the invention are described below.

Example 1

A nickel hydroxide powder serving as an active material, copper powder serving as an additive according to the present invention, and tetrafluoroethylene powder serving as a binder were mixed together in a ratio of 87:10:3 by weight. The resultant mixture, which is referred to herein as "an active material mixture", was applied to a foam nickel substrate plate so as to fill in the pores of the plate. The plate with the active material mixture was compressed at a pressure of 3 t/cm$^2$ (where "t"=metric ton) to obtain a disc-shaped nickel hydroxide electrode 20 mm in diameter which is referred to as "Electrode A".

Example 2

In this example, one-half the amount of the metal copper powder used in Example 1 was replaced with a nickel powder. In particular, a nickel hydroxide powder, copper powder, nickel powder and tetrafluoroethylene powder were mixed together in the ratio of 87:5:5:3. The resultant active material mixture was applied to a foam nickel substrate plate so as to fill in the pores of the plate. The plate with the active material mixture was then compressed at a pressure of 3 t/cm$^2$ to obtain a disc-shaped nickel hydroxide electrode 20 mm in diameter which is referred to as "Electrode B".

Comparison Example 3

For the purpose of comparison, the copper powder used in Example 1 was totally replaced with a nickel powder. Specifically, a nickel hydroxide powder, a nickel powder and a tetrafluoroethylene powder were mixed together in a ratio of 87:10:3. The resultant active material mixture was applied on a foam nickel substrate plate so as to fill in the pores of the plate. The plate with the active material mixture was compressed at a pressure of 3 t/cm$^2$, to obtain a disc-shaped nickel hydroxide electrode 20 mm in diameter which is referred to as "Electrode C".

Figure 1:
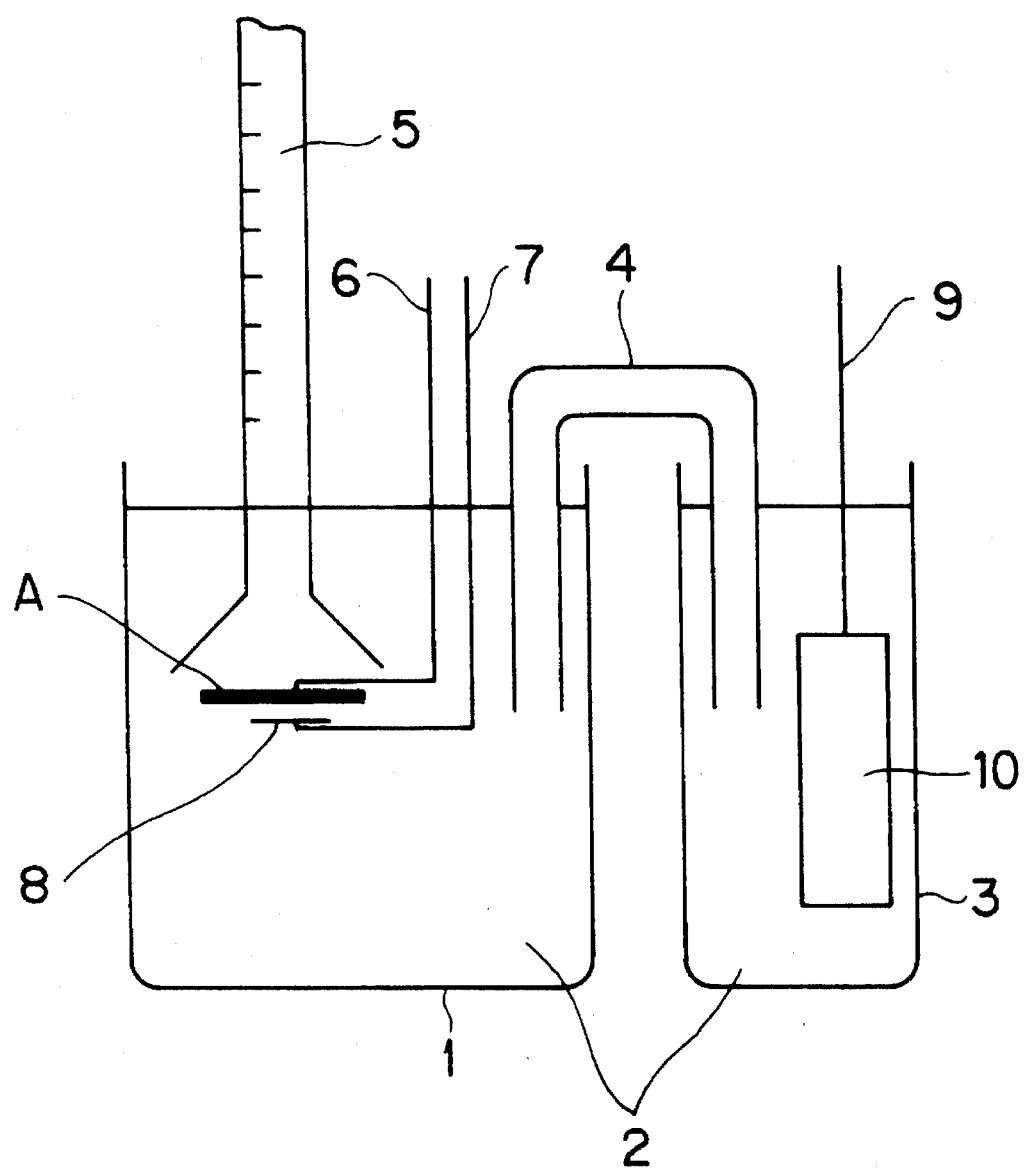
FIG. 1 is a schematic view of a gas measuring apparatus as used in carrying out the tests described below.

Electrodes A and B according to the present invention and Electrode C according to the conventional art were tested using a gas measuring apparatus to obtain their respective abilities to absorb hydrogen gas. FIG. 1 shows a schematic of the gas measuring apparatus utilized in conducting the tests. A first container 1 holds 30 wt. % of a potassium hydroxide electrolyte solution 2. A second container 3 holds the same potassium hydroxide electrolyte solution 2. A conduit 4 connects first container 1 and second container 3. A gas buret 5 is used to quantitatively measure the gas collected or captured. An open end of the gas buret is submerged in the electrolyte solution 2 in the first container 1 for collecting gas.

Test 1

Test 1 was initially conducted with Electrode A. Electrode A was attached to the L-shaped, bent lower end of a lead wire 6 submerged in electrolyte solution 2 and positioned horizontally below the open end of gas buret 5. A disc-shaped nickel plate 8 attached to the L-shaped, bent lower end of a lead wire 7 was positioned below and parallel at a spaced distance of 5 mm from Electrode A. Further, a rectangular nickel plate 10 attached to the lower end of a lead wire 9 was submerged in electrolyte solution 2 of the second container 3.

Using nickel plate 10 as a counter electrode, Electrode A, was charged with an electric current amounting to 15 milliampere (mA) per 1 gram of the nickel electrode until Electrode A became completely charged. Thereafter, the counter electrode was shifted from nickel plate 10 to nickel plate 8 facing Electrode A and electric current applied to Electrode A and nickel plate 8 for charging. In this operation, all the hydrogen gas generated from nickel plate 8 comes into contact with Electrode A. Oxygen gas is generated from Electrode A during this operation. The oxygen gas and the hydrogen gas not absorbed by Electrode A was collected by gas buret 5 and the amount or quantity of the gas collected measured. By deducting the amount of the collected gas from a theoretical amount or quantity of generated hydrogen gas and oxygen gas calculated on the basis of the charging current and time (i.e., the quantity of applied electricity), the amount or quantity of hydrogen gas absorbed by Electrode A was obtained.

Each of Electrode B and Electrode C were in turn tested in the same manner as Electrode A as described above. The amount of hydrogen gas absorbed by each of Electrode B and Electrode C was obtained.

Figure 2:
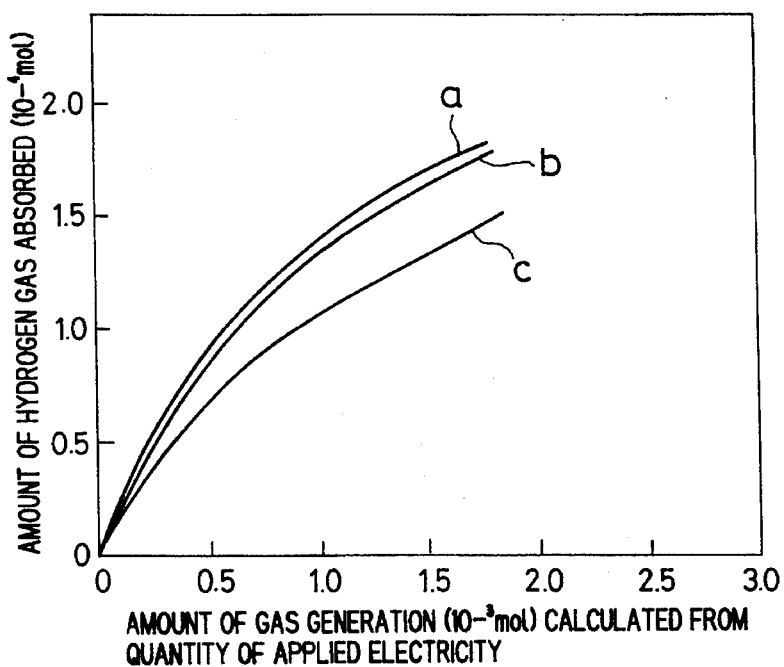
FIG. 2 is a graph showing the hydrogen gas absorptive rate curves for one set of test electrodes as described below with regard to the amount of hydrogen gas absorbed by the test electrodes in a completely charged state and under the application of current, and a theoretical amount of gas generation calculated from the quantity of applied electricity.

The results of the foregoing tests are shown in FIG. 2. FIG. 2 shows curves representing the relationship between the amount of gas generation calculated from the quantity of applied electricity and the amount of hydrogen gas absorbed by each of Electrodes A, B, and C. Symbols a, b and c indicate the curves of the hydrogen gas absorption rate of Electrode A, Electrode B and Electrode C, respectively. As clear from FIG. 2, when the nickel hydroxide electrode contains a copper additive, the rate of absorption of hydrogen gas is accelerated and improved.

Test 2

Test 2 was carried out on Electrodes A, B and C as prepared above. After Electrode A was completely charged by applying an electric current amounting to 15 mA per 1 gram of the nickel electrode used as a counter electrode in the same manner as described above in Test 1, the electric current application to Electrode A was stopped. Nickel plate 8 serving as a negative electrode and nickel plate 10 serving as a positive electrode were then connected together. Electric current was applied therebetween in the same manner described in Test 1. Electrode A in a completely charged state without further application of electric current was then exposed to hydrogen gas generated from nickel plate 8. The hydrogen gas which was not absorbed by Electrode A was collected by gas buret 5 and the amount of collected gas measured. By deducting the measured amount of collected gas from a theoretical amount of generated hydrogen gas and oxygen calculated on the basis of the charging current and time (i.e., quantity of applied electricity), the amount of hydrogen gas absorbed by Electrode A was obtained. Test 2 was also carried out in the same manner with each of Electrode B and Electrode C.

Figure 3:
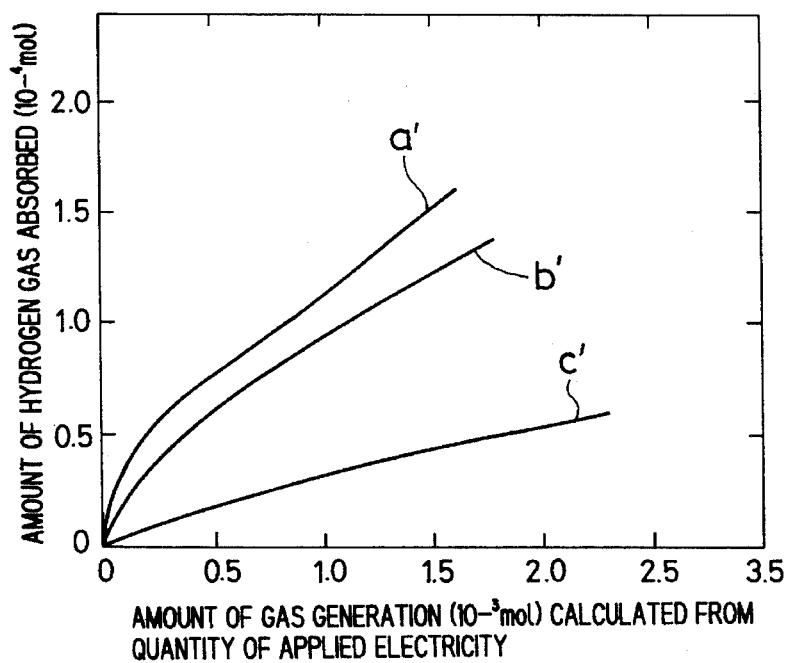
FIG. 3 is a graph showing the hydrogen gas absorptive rate curves of a second set of test electrodes as described below with regard to the amount of hydrogen gas absorbed by the test electrodes in a completely charged state and without application of current, and a theoretical amount of gas generation calculated from the quantity of applied electricity.

The results of Test 2 with respect to Electrodes A, B and C are shown in FIG. 3. FIG. 3 shows the relationship between the amount of gas generation calculated from the quantity of applied electricity and the amount of hydrogen gas actually absorbed by each of Electrodes A, B and C. Symbols a', b' and c' indicate the curves of hydrogen gas absorption rate of Electrode A, Electrode B and Electrode C, respectively. As clear from FIG. 3, when the nickel hydroxide electrode contains a copper additive, the rate of absorption of hydrogen gas is accelerated and improved.

Additional electrodes were made which, rather than including copper powder, included respectively, cuprous oxide powder alone, cupric oxide powder alone, and various mixtures of two or three of copper powder, cuprous oxide powder and cupric oxide powder, together with nickel hydroxide active powder in the same manner as described above. Tests 1 and 2 for measuring hydrogen absorption were then carried out on these respective nickel hydroxide electrodes in the same manner as described above. The same trends, i.e., hydrogen absorption rate curves as shown in FIGS. 2 and 3, were observed. Accordingly, the same advantageous acceleration of hydrogen gas absorption was obtained by nickel hydroxide electrodes containing each copper-based additive alone and mixtures of the copper-based additives.

Example 4

Sealed AA-size storage batteries were manufactured using as a positive electrode nickel hydroxide electrodes according to the present invention. The electrodes were manufactured using, respectively, active material mixtures prepared by adding with a nickel hydroxide active material each of a copper powder, a cuprous oxide powder and a cupric oxide powder. The respective active material mixtures each further included a CMC aqueous solution as a thickener to form a paste. The paste mixtures were applied to separate porous metal substrate plates so as to fill in the pores of the plates. The plates were then pressed to a predetermined thickness.

The internal pressure of the sealed batteries using the nickel hydroxide electrodes as described above in a completely charged state was reduced ½ to ⅕ as compared to the internal pressure of a conventional nickel-hydroxide battery. In a nickel-cadmium battery, even when the ratio of the negative electrode's capacity to the positive electrode's capacity was lowered from 1.7 to 1.4, the internal pressure of the battery was not increased. As a result, the battery capacity per unit volume was able to be reduced by about 10%.

Example 5

As an alternative to adding one or more copper-based additives to the nickel hydroxide active material, one or more of the copper-based additives can be added to a porous metal substrate, such as a foam nickel substrate plate, a punched plate or the like. The additive(s) can be added as a raw material in the manufacture of the porous metal substrate in an amount of about 2–10 wt. % based on the total weight of the substrate plate. In this manner, the copper-based additive particles will be distributed uniformly over the exterior surfaces of the substrate. A conventional nickel hydroxide active material mixture is used with the substrate. An active material mixture useful with the substrate can include a nickel hydroxide active powder material as a main component and, as minor components, an electroconductive material such as a nickel powder, a cobalt powder or the like, and a binder such as a tetrafluoroethylene powder. This conventional mixture was applied to the above described porous metal substrates to make nickel hydroxide electrodes which were used as positive electrodes in alkaline storage batteries. The rate of absorption of hydrogen gas for these batteries was much improved and the internal pressure of the batteries reduced as compared with conventional alkaline batteries using conventional nickel hydroxide electrodes.

Thus, one or more copper-based additive(s) can be contained in either the nickel hydroxide active material of the electrode, in the porous metal substrate of the electrode, or both.

As set forth above, one or more manganese-based additives can be utilized in a nickel hydroxide active material, porous metal substrate or both in the same manner as the copper-based additive(s) to provide a nickel hydroxide electrode. Each manganese-based additive can be used alone or in mixtures with another manganese-based additive and/or the copper-based additive(s). The electrode has improved hydrogen gas absorptivity which results in the battery containing the electrode having a reduced internal pressure rise, and the ability to reduce the excess capacity of the negative electrode.

The manganese-based additive(s) function essentially the same as the copper-based additive(s). The manganese-based additive(s) as contained in the nickel hydroxide electrode is oxidized during charging to become a higher state oxidized manganese compound which has a high absorptivity with respect to hydrogen gas. The manganese oxides produced absorb hydrogen gas immediately when they come into contact with hydrogen gas. As a result, the manganese-based additive is reduced by hydrogen. The reduced additive, however, is capable of being oxidized again by subsequent electric charging. Accordingly, the nickel hydroxide electrode including at least one manganese-based additive according to the present invention continuously exhibits rapid hydrogen gas absorptivity. Consequently, when the electrode is used as a positive electrode in an alkaline battery, the battery has a high rate of absorption of hydrogen gas and the rise in internal pressure in the battery is reduced.

The manganese-based additive(s) can be included in a nickel hydroxide active material, in a porous metal substrate (such as a foam metal substrate, a sintered metal substrate) or both in the same manner as described for the copper-based additive(s). The manganese-based additive(s) are utilized in a positive active material mixture in an amount of about 0.5 to 10 wt. %. The manganese-based additive(s) are contained as a raw material in a porous metal substrate in an amount about 2 to 10 wt. % based on the total weight of the substrate.

Specific examples of positive electrodes including manganese-based additive(s) according to the present invention are set forth below.

Example 6

A nickel hydroxide powder serving as an active material, a metal manganese powder serving as an additive and tetrafluoroethylene powder serving as a binder were mixed together in a ratio of 87:10:3 by weight. The resultant mixture was applied to a foam nickel substrate plate to fill in the pores of the plate. The plate with the active material mixture was compressed at a pressure of 3 t/cm$^2$ to obtain a disc-shaped nickel hydroxide electrode 20 mm in diameter which is referred to as "Electrode D".

Example 7

In this example, one-half the amount of the metal manganese powder used in Example 6 was replaced with nickel powder. In particular, a nickel hydroxide powder, manganese powder, nickel powder and tetrafluoroethylene powder were mixed together in a ratio of 87:5:5:3 by weight. The resultant active material mixture was applied to a foam nickel substrate plate to fill in the pores of the plate. The plate with the active material mixture was compressed at a pressure of 3 t/cm$^2$ to obtain a disc-shaped nickel hydroxide electrode 20 mm in diameter which is referred to as "Electrode E".

A hydrogen gas absorption test was then carried out using Electrode D and Electrode E and the gas measuring apparatus as shown in FIG. 1. The test was conducted in the same manner as in Test 1 described above with the exception that Electrode A was each replaced by Electrode D and Electrode E.

Figure 4:
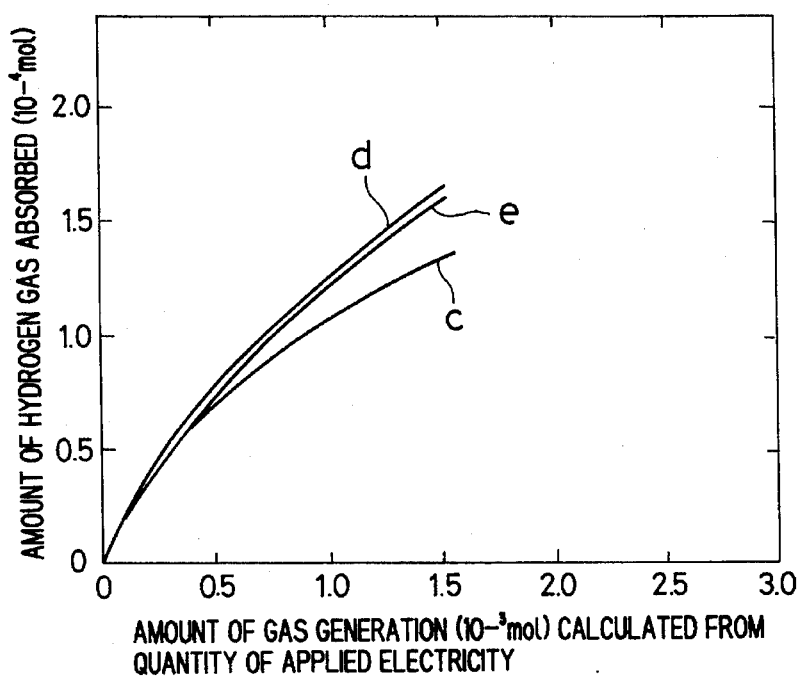
FIG. 4 is a graph similar to that described in relation to FIG. 2 with respect to a third set of test electrodes as described below.

The results of the tests are shown in FIG. 4. FIG. 4 illustrates the relationship between the amount of gas generation calculated from the quantity of applied electricity and the amount of hydrogen gas absorbed by each of Electrodes D and E. For the purpose of comparison, the test results obtained with Electrode C (which was prepared using a conventional composition) is also shown in FIG. 4. The symbols d, e and c indicate the curves of the hydrogen gas absorption rate of Electrode D, Electrode E and Electrode C, respectively.

As clear from FIG. 4, when the nickel hydroxide electrode includes a manganese additive, the rate of absorption of hydrogen gas is accelerated and improved.

Further, hydrogen gas absorption tests were carried out with respect to Electrode D and Electrode E using the gas measuring apparatus as shown in FIG. 1 in the same manner as described in Test 2.

Figure 5:
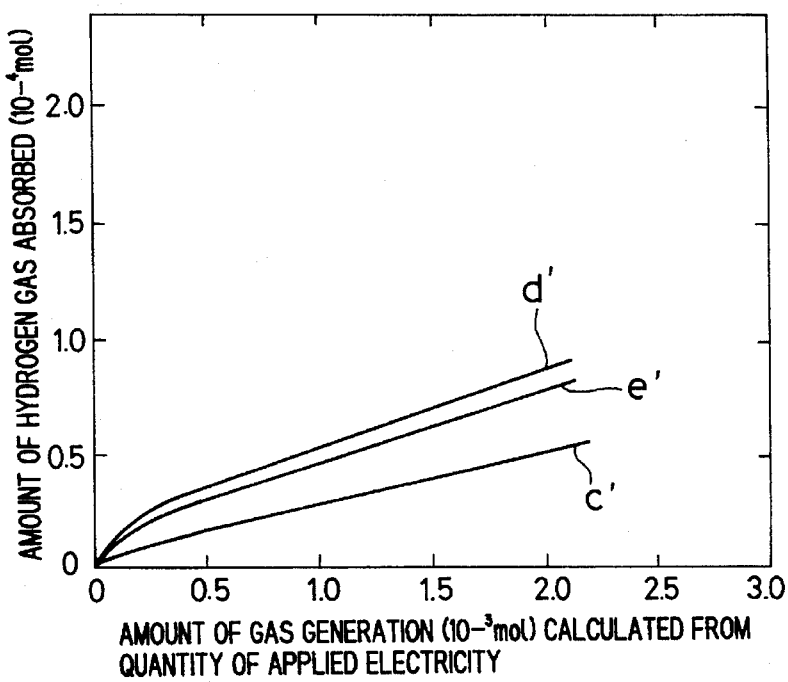
FIG. 5 is a graph similar to that described in relation to FIG. 3 with respect to a fourth set of test electrodes as described below.

The results of these tests are shown in FIG. 5. FIG. 5 shows the relationship between the amount of gas generation calculated from the quantity of applied electricity and the amount of hydrogen gas absorbed through the hydrogen absorption rate of Electrode D and Electrode E. For the purpose of comparison, the test results obtained with Electrode C (which was prepared using a conventional composition) are also shown in FIG. 5. Symbols d', e', and c' indicate the curves of the hydrogen gas absorption rate of Electrode D, Electrode E and Electrode C, respectively.

As clear from FIG. 5, when the nickel hydrogen electrode includes a manganese-based additive, the rate of absorption of hydrogen gas is accelerated and improved.

Further, in addition to using the metal manganese powder, one or more of manganese compounds containing oxygen, such as $MnO$, $Mn_2O_3$, $Mn_3O_4$, $MnO_2$, $MnO_3$, $Mn_2O_7$, $Mn(OH)_2$, $MnCO_3$, $K_2MnO_2$, and $KMnO_4$, can be utilized. Combinations of manganese compounds as above described were added to the nickel hydrogen active material and nickel hydroxide electrodes prepared in the same manner as described above. Tests as described above in relation to Test 1 and Test 2 were carried out using these respective nickel hydroxide electrodes and the gas measuring apparatus shown in FIG. 1. Essentially the same hydrogen gas absorption rate curves as shown in FIG. 4 and FIG. 5 were obtained for the electrodes prepared containing a combination of manganese compounds.

Example 8

Sealed AA-size storage batteries including nickel hydroxide positive electrodes were manufactured using active material mixtures prepared utilizing a nickel hydroxide active material, each manganese-based additive described above individually and a CMC aqueous solution as a thickener to form a paste. These paste mixtures were then each applied to separate porous metal substrate plates so as to fill in the pores of the plates. The plates were pressed to a predetermined thickness. The sealed nickel-hydroxide batteries produced had an internal pressure which was reduced ½ to ⅕ as compared with the internal pressure of a conventional nickel-hydroxide battery. When an electrode according to the invention was used in a nickel-cadmium battery (even when the ratio of the negative electrode's capacity to the positive electrode's capacity was reduced from 1.7 to 1.4) the internal pressure of the battery was not increased. As a result, the battery capacity per unit volume was able to be reduced by about 10%.

Example 9

Rather than combining a nickel hydroxide active material and at least one of the manganese-based additives, at least one of the manganese-based additives can be added to a porous metal substrate plate such as a foam nickel substrate plate, a nickel sintered substrate plate or the like, as a raw material in the manufacturing of the porous metal substrate plate. The manganese-based additive(s) are included in an amount of about 2–10 wt. % based on the total weight of the substrate. Manganese-based additive particles are thereby distributed uniformly in the exterior surfaces of the substrate. A conventional nickel hydroxide active material is then used with the substrate. For example, a nickel hydroxide active material as a main component is mixed together with, as minor components, an electro-conductive material such as a nickel powder, a cobalt powder or the like, and a binder such as a tetrafluoroethylene powder or the like. This mixture was applied to the above prepared porous metal substrates to provide nickel hydroxide electrodes according to the present invention. The nickel hydroxide electrodes were used as positive electrodes in alkaline storage batteries. When these batteries were used, the rate of absorption of hydrogen gas was improved and the internal pressure of the batteries reduced as compared to batteries having conventional nickel hydroxide electrodes.

Thus, the manganese-based additive(s) can be contained in either the nickel hydroxide active material, the porous metal substrate, or both and provide effective results. A primary advantageous effect provided is that the excessive volume or capacity of the negative electrode in relation to the capacity of the positive electrode can be reduced due to the accelerated absorption of hydrogen gas by the positive electrode made according to the present invention. This results in a decrease in the capacity of the alkaline battery per unit volume.

As will be apparent to one skilled in the art, various modifications can be made within the scope of the aforesaid description. Such modifications being within the ability of one skilled in the art form a part of the present invention and are embraced by the appended claims.

It is claimed:

1. A nickel hydroxide positive electrode comprising a porous metal substrate, nickel hydroxide active particles, and at least one additive selected from members of a group consisting of copper-based additives and manganese-based additives, wherein said copper-based additives are members of a group consisting of copper, cuprous oxide and cupric oxide; and said manganese-based additives are members of a group consisting of metal manganese, $MnO$, $Mn_2O_3$, $Mn_3O_4$, $MnO_2$, $MnO_3$, $Mn_2O_7$, $Mn(OH)_2$, $MnCO_3$, $K_2MnO_2$, and $KMnO_4$; and wherein said at least one additive is present in said electrode such that said at least one additive is present only externally to outer surface of the nickel hydroxide active particles.

2. A nickel hydroxide positive electrode according to claim 1 wherein said at least one additive is present in mixture with said nickel hydroxide active particles.

3. A nickel hydroxide positive electrode according to claim 1 wherein said at least one additive is present as an integral part of said porous metal substrate.

4. A nickel hydroxide positive electrode according to claim 1 wherein said at least one additive is present both in mixture with said nickel hydroxide active particles and as an integral part of said substrate.

5. A nickel hydroxide positive electrode according to claim 2 or claim 4 wherein said at least one additive in mixture with said nickel hydroxide active particles is present in an amount of from 0.5 to 10 wt. % based on the weight of the mixture.

6. A nickel hydroxide positive electrode according to claim 3 or claim 4 wherein said at least one additive incorporated in said substrate is present in an amount of from about 2 to 10 wt. % based on the total weight of the substrate.

7. A nickel hydroxide positive electrode according to claims 1, 2 or 4 wherein said nickel hydroxide active particles are additionally mixed with a binder.

8. A nickel hydroxide positive electrode according to claims 1, 2 or 4 wherein said nickel hydroxide active particles are additionally mixed with a thickener.

9. A nickel hydroxide positive electrode according to claims 1, 2, 3 or 4 in combination with a negative electrode; an electrolyte solution; and a container for containing said positive electrode, said negative electrode and said electrolyte solution in a sealed manner to provide an alkaline storage battery.

* * * * *